United States Patent
Iwata et al.

(10) Patent No.: US 7,809,218 B2
(45) Date of Patent: Oct. 5, 2010

(54) OPTICAL MODULATORS

(75) Inventors: Yuichi Iwata, Nagoya (JP); Osamu Mitomi, Nagoya (JP); Jungo Kondo, Nishikamo-Gun (JP); Kenji Aoki, Ichinomiya (JP)

(73) Assignee: NGK Insulators, Ltd., Nagoya, Aichi-Prefecture (JP)

( * ) Notice: Subject to any disclaimer, the term of this patent is extended or adjusted under 35 U.S.C. 154(b) by 4 days.

(21) Appl. No.: 12/336,640

(22) Filed: Dec. 17, 2008

(65) Prior Publication Data
US 2009/0154867 A1    Jun. 18, 2009

(30) Foreign Application Priority Data
Dec. 18, 2007    (JP) ............... 2007-325744

(51) Int. Cl.
G02F 1/035    (2006.01)
G02F 1/01     (2006.01)
(52) U.S. Cl. .............................. 385/3; 385/1
(58) Field of Classification Search ........... 385/1–3
See application file for complete search history.

(56) References Cited

U.S. PATENT DOCUMENTS

| | | | | |
|---|---|---|---|---|
| 5,748,358 A * | 5/1998 | Sugamata et al. | ........... | 359/245 |
| 5,982,958 A * | 11/1999 | Minowa et al. | ........... | 385/2 |
| 6,473,547 B2 * | 10/2002 | Longone | ........... | 385/40 |
| 6,700,691 B2 * | 3/2004 | Nespola et al. | ........... | 359/254 |
| 6,879,737 B2 * | 4/2005 | Kambe | ........... | 385/2 |
| 6,956,980 B2 * | 10/2005 | Nagata et al. | ........... | 385/2 |
| 7,522,783 B2 * | 4/2009 | Glebov et al. | ........... | 385/2 |
| 2002/0126932 A1 | 9/2002 | Minakata et al. | | |
| 2004/0264832 A1 | 12/2004 | Kondo et al. | | |

FOREIGN PATENT DOCUMENTS

| | | |
|---|---|---|
| EP | 0 813 092 A1 | 12/1997 |
| EP | 1 258 772 A1 | 11/2002 |
| EP | 1348992 | 10/2003 |
| EP | 1 455 219 A1 | 9/2004 |
| JP | 09-297288 A1 | 11/1997 |
| JP | 2002-169133 A1 | 6/2002 |
| WO | 03/042749 A1 | 5/2003 |

OTHER PUBLICATIONS

U.S. Appl. No. 12/336,628, filed Dec. 17, 2008, Iwata et al.
Summons to Attend Oral Proceedings Pursuant to Rule 115(1) EPC from EP Patent App. No. 08171962.7 (Aug. 6, 2010).

* cited by examiner

*Primary Examiner*—Rhonda S Peace
(74) *Attorney, Agent, or Firm*—Cermak Nakajima LLP; Tomoko Nakajima

(57) ABSTRACT

An object of the present invention is, in an optical modulator, to increase the production yield by enhancing the patterning accuracy of the electrodes, as well as to reduce the electrode loss by increasing the thickness of the electrodes. An optical modulator has a substrate 5 made of an electro-optical material; a modulation electrode 2A, 3A, 2B provided on the substrate 5; and an optical waveguide 1c provided on the substrate 5. Light propagating through the optical waveguide 1c is modulated by applying a modulation voltage to the modulation electrode. At least a part of the modulation electrode includes a base 2a, 3a formed on the substrate 5 and a projection part 2b, 3b having a width narrower than that of the base.

5 Claims, 14 Drawing Sheets

OPTICAL MODULATORS

This application claims the benefit of Japanese Patent Application P2007-325744 filed on Dec. 18, 2007, the entirety of which is incorporated by reference.

TECHNICAL FIELD

The present invention relates to an optical modulator.

BACKGROUND ARTS

A demand for broadband communications has increased accompanied with recent developments in multimedia, an optical transmission system exceeding 10 G b/s is in practical use, and a further speeding-up thereof is expected. The LN optical modulator is used as a device for modulating an electric signal (microwave signal) exceeding 10 G b/s into a light signal.

In order to meet the velocity matching condition in the structure designed to thin an optical waveguide substrate, it is necessary to make the thickness of the substrate around the optical waveguide to be about 10 μm, for example. The inventors have applied for a patent of a two-stage back-groove structure with Japanese Patent Laid-Open Publication No. 2002-169133A, in order to prevent the optical mode field pattern from flattening, and to reduce the propagation loss of light generated by the influence of a surface roughness and damages due to thinning the substrate and machining the groove.

The inventors have disclosed, in WO 03/042749A, an optical waveguide device in which a flat supporting substrate and an optical waveguide substrate are adhered.

SUMMARY OF THE INVENTION

However, it was generally difficult to design so as to meet all the conditions of the characteristic impedance matching of electrodes, the velocity matching, the drive voltage characteristic, and the electrode loss. For example, in order to meet a predetermined velocity matching condition, it is generally necessary to increase the electrode thickness. However, increasing the electrode thickness involves increasing the resist thickness, which deteriorates the patterning accuracy. In that case, the positions of the electrodes are shifted; accordingly, the drive voltage and the characteristic impedance are varied, and the velocity matching condition is also varied. Consequently, there come out many optical modulators not satisfying the specification on the production line, thus lowering the production yield.

An object of the present invention is, in the optical modulator, to increase the production yield by enhancing the patterning accuracy of the electrodes, as well as to reduce the electrode loss by increasing the thickness of the electrodes.

An optical modulator of the present invention comprises:
a substrate comprising an electro-optical material;
a modulation electrode provided on the substrate; and
an optical waveguide provided on the substrate, wherein:
light propagating through the optical waveguide is modulated by applying a modulation voltage on the modulation electrode; and
at least a part of the modulation electrode comprises a base formed on the substrate and a projection part having a width narrower than that of the base.

According to the present invention, at least a part of the modulation electrode of the optical modulator comprises a base formed on the substrate, and a projection part having a width narrower than that of the base. As a result, the patterning accuracy of the modulation electrode is determined by the thickness of the relatively wide base. Provided that the thickness of the whole electrode is constant, when the electrode width is constant, increasing the electrode thickness will greatly lower the patterning accuracy. However, in the optical modulator according to the present invention, the thickness of the base can be decreased by providing the projection part to the electrode of which the width is narrower than that of the base, therefore enhancing the patterning accuracy. On the other hand, the present inventors found that the electrode loss is hardly lowered by providing the projection part, and thereby achieving the invention.

BEST MODES FOR CARRYING OUT THE INVENTION

Figure 1:
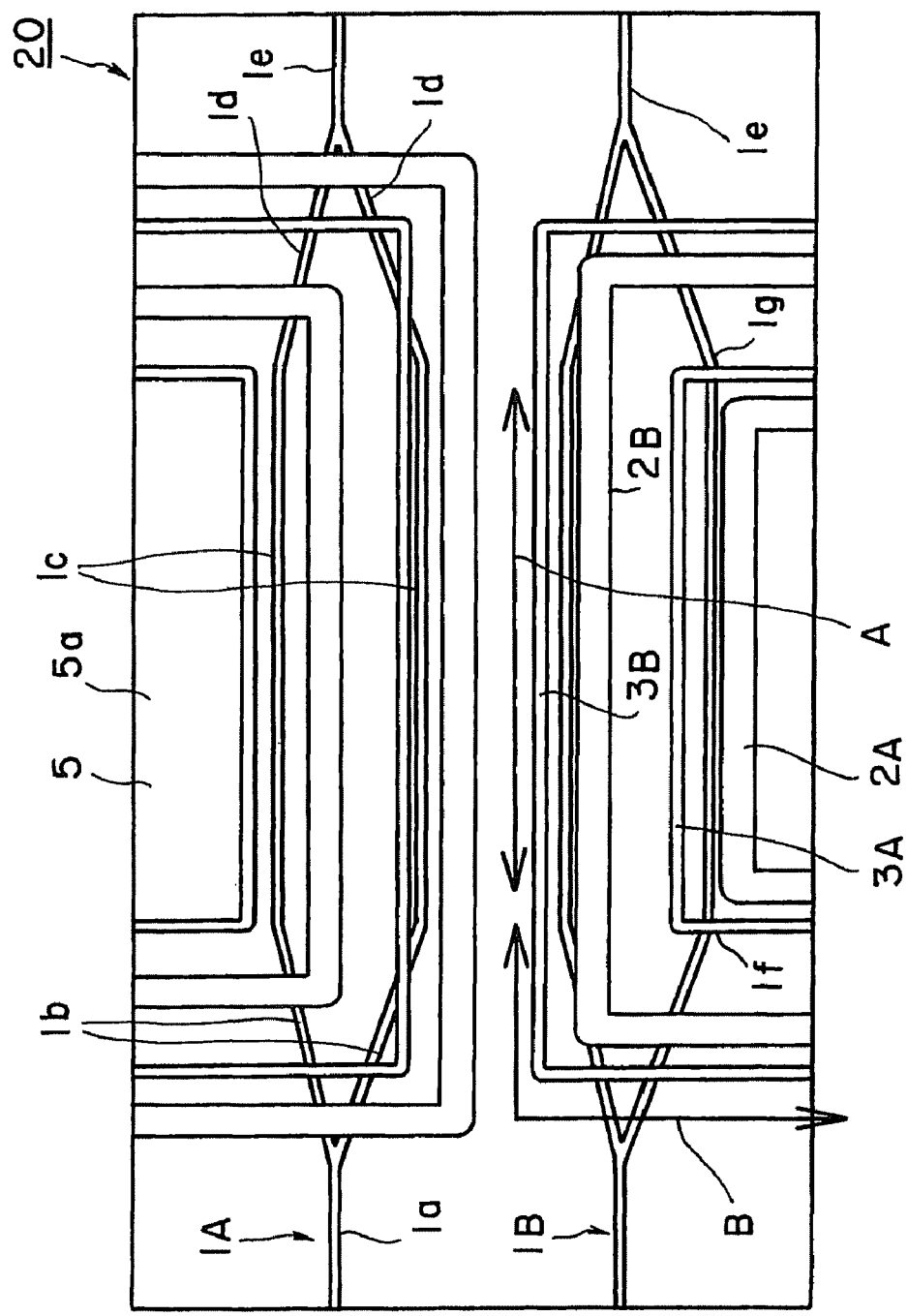
FIG. 1 is a schematic plan view illustrating a planar pattern of an optical modulator 20 according to the present invention.

The optical modulator of the present invention is not limited as long as it applies a modulation to the characteristic of light, and it may be an optical intensity modulator, or an optical phase modulator. The optical intensity modulator may be an optical amplitude modulator using a Mach-Zehnder optical waveguide. The optical phase modulator means one that applies a phase modulation to incident light and picks out a phase modulated signal from outgoing light. The type of the optical phase modulator is not particularly limited, and various modulation systems such as DQPSK, SSB, or the like can be used.

In a preferred embodiment, the optical phase modulator comprises plural optical phase modulation parts. In this embodiment, preferably, a first ground electrode or a second ground electrode of one optical phase modulation part forms a common ground electrode with a first ground electrode or a second ground electrode of the adjacent optical phase modulation part. Forming such a common ground electrode can reduce the dimension required for the optical phase modulation part, and contribute to downsizing the chip.

The phase modulation system in case of using plural phase modulation parts is not particularly limited, and various phase modulation systems can be adopted: such as DQPSK (Differential Quadrature Phase Shift Keying), SSB (Single Side Band amplitude modulation), and DPSK (Differential Phase Shift Keying), etc. These modulation systems themselves are generally known.

The electro-optical material forming the optical waveguide substrate is not particularly limited; however, it is made of a ferroelectric electro-optical material, preferably a single crystal. Such a single crystal is not particularly limited as long as it is capable of modulating light, and the followings can be exemplified: lithium niobate, lithium tantalate, lithium niobate-lithium tantalate solid solution, potassium lithium niobate, KTP, GaAs, and quartz.

The type of the modulation electrode provided on the substrate is not particularly limited as long as it is capable of modulating light. In a preferred embodiment, the modulation electrode refers to a signal electrode and a ground electrode.

The present invention can also be applied to an interaction section of the signal electrode and the ground electrode. The interaction section refers to a section that directly exerts a modulation effect on the light propagating through the optical waveguide. In this case, it is particularly effective to apply the present invention to the interaction section of the signal electrode.

Further, the present invention can also be applied to each of feed-through sections of the signal electrode and the ground electrode. In this case, it is possible to enhance the patterning accuracy of the feed-through sections, and at the same time, to reduce the electrode losses of the feed-through sections.

The material of the modulation electrode is not particularly limited as long as it shows a low resistance and an excellent impedance characteristic, and the electrode can be made of such material as gold, silver, copper, and the like.

The optical waveguide is formed in the substrate, preferably formed on the surface side of the substrate. The optical waveguide may be a ridge-type optical waveguide that is directly formed on the surface of the substrate, or a ridge-type optical waveguide that is formed on the surface of the substrate with intervention of another layer, or an optical waveguide formed inside the substrate by means of the internal diffusion method or the ion-exchange method, for example, a titanium-diffusion optical waveguide, or a proton-exchange optical waveguide. Although the electrodes are formed on the surface side of the substrate, they may be formed directly on the substrate surface, or formed on the buffer layer.

The type of an adhesive for adhering the optical waveguide substrate and a supporting substrate is not particularly limited; however, the thickness of the adhesive is preferably below 300 μm. As a low dielectric material preferably used for a low dielectric constant layer, it is desirable to use a material having a low dielectric loss (low tan δ), from the viewpoint of reducing the propagation loss of the high-frequency modulation signal. As such a material having a low dielectric constant or a low dielectric loss, Teflon and acrylic adhesives can be exemplified. As other low dielectric constant materials, glass-based adhesives, epoxy-based adhesives, interlayer insulators for a semiconductor production, polyimide resin, and the like can be exemplified.

Figure 2:
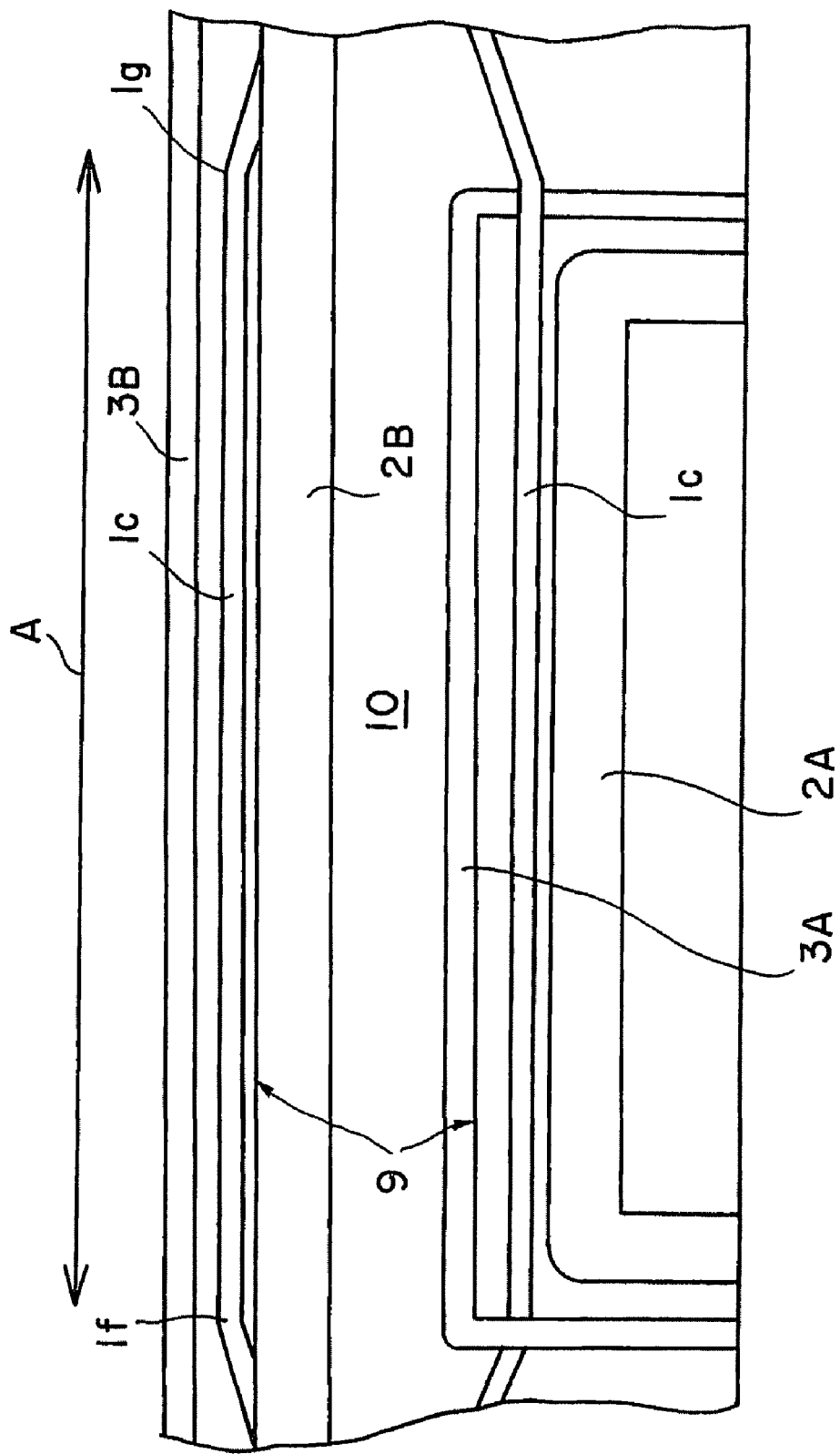
FIG. 2 is a partially enlarged view of the pattern in FIG. 1.
Figure 3:
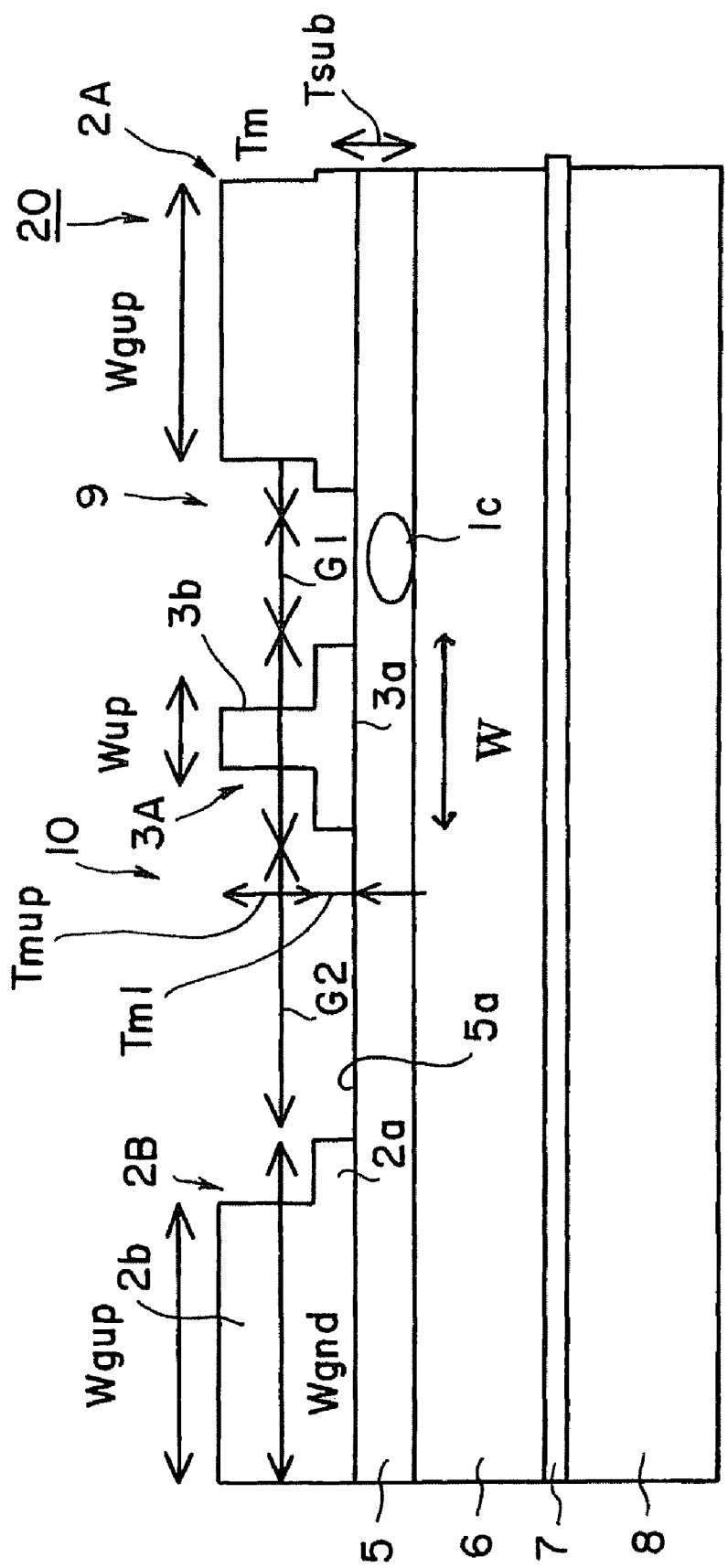
FIG. 3 is a schematic sectional view of the optical modulator 20 in FIG.

FIG. 1 is a plan view schematically illustrating an optical modulator 20 according to the present invention, FIG. 2 is a partially enlarged view of the optical modulator in FIG. 1, and FIG. 3 is a schematic sectional view of the optical modulator in FIG. 1.

The optical modulator 20 of this example is of the DQPSK system. Two-line Mach-Zehnder optical waveguides 1A, 1B, for example, are formed on a surface 5a of a flat optical waveguide substrate 5. Each of the optical waveguides forms an independent optical modulation part. Each of the optical waveguides has an incident section 1a, branch sections 1b,1d, interaction sections 1c, and an outgoing section 1e. 1f and 1g are curving parts. Thus, four rows of the interaction sections 1c are formed on the substrate 5.

A pair of signal electrodes 3A or 3B and a pair of ground electrodes 2A or 2B are formed corresponding to each of the interaction sections 1c. Gaps 9 are each formed between the signal electrodes and the ground electrodes being adjacent to each other FIGS. 2 and 3), and the interaction sections 1c are disposed inside the gaps on the plan view. The symbol A denotes an area of the interaction section, and the symbol B denotes an area of the feed-through section.

In this example, the signal electrode 3A (3B) is provided with a relatively wide base 3a and a relatively narrow projection part 3b formed on the base 3a. The ground electrode 2A (2B) is provided with a relatively wide base 2a and a relatively narrow projection part 2b formed on the base 2a. In this case, the relatively wide bases 2a, 3a and the relatively narrow projection parts 2b, 3b are required to be separately patterned with individual masks.

The bases 2a, 3a can be thinned by providing the projection parts 2b, 3b; and since the thickness thereof is small, the thickness of the resist in the patterning can be reduced. The small thickness of the resist can enhance the dimensional accuracy in the patterning, and also remarkably reduce a deviation from the dimensional specification.

On the other hand, providing the projection parts 2b, 3b can remarkably reduce the electrode loss. In the case where the present invention is applied to the signal electrode and the ground electrode, it is advantageous from the viewpoint of the velocity matching and characteristic impedance, since the electrode can be made thicker; thus, the present invention exhibits a remarkable effect that the velocity matching and the characteristic impedance hardly deteriorate, in comparison to the case that the whole width is constant.

A conductive film (shielding film) 7 is formed on the surface of a supporting substrate 8. The bottom of the optical waveguide substrate 5 is adhered through an adhesive layer (low dielectric layer) 6 to the conductive film 7 on the supporting substrate 8.

Figure 4:
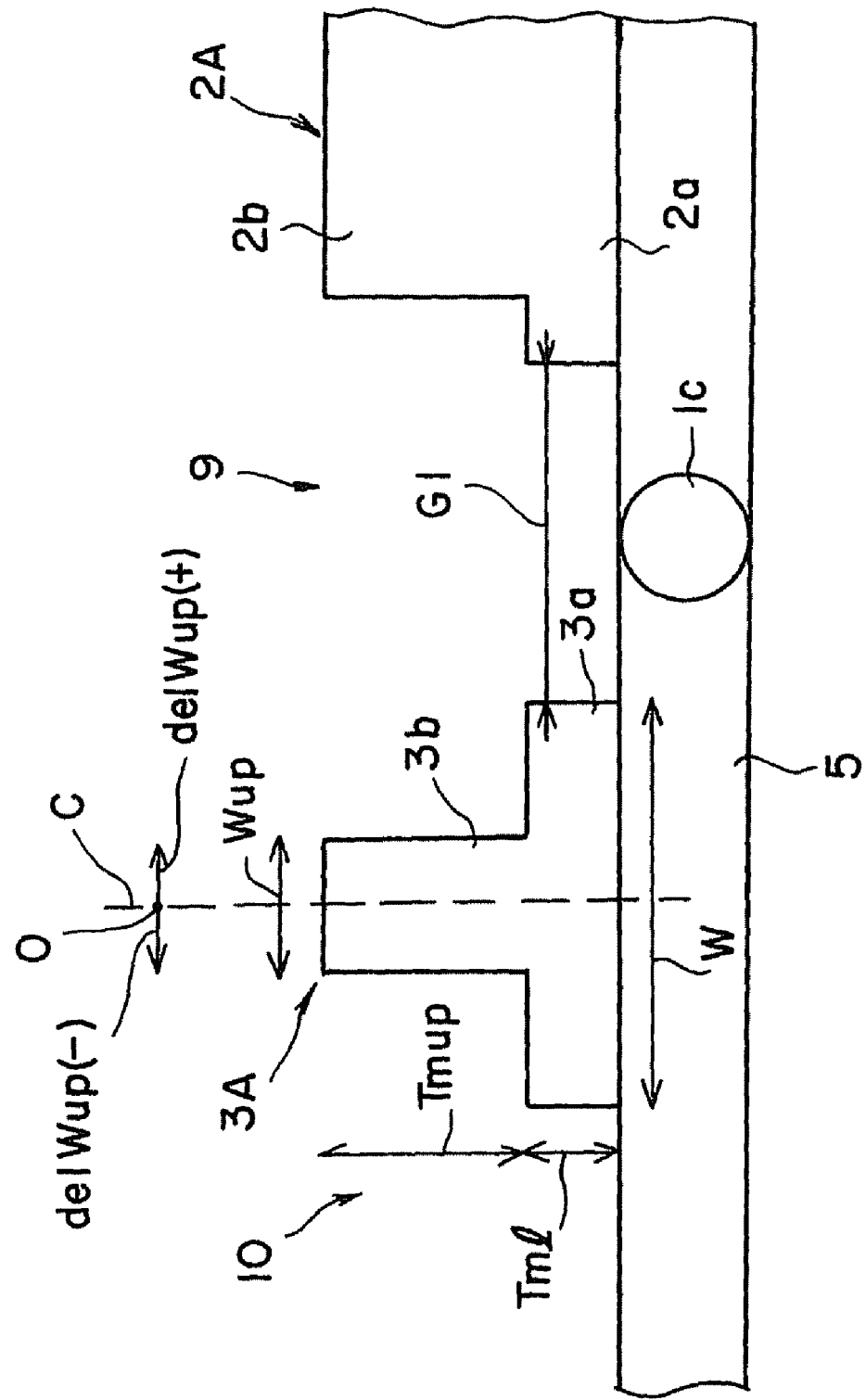
FIG. 4 is a partially enlarged view illustrating dimensions of the optical modulator in FIG. 3.

The differences between the widths Wgnd, W of the bases 2a, 3a and the widths Wgup, Wup of the corresponding projection parts 2b, 3b (refer to FIGS. 3 and 4) are, from the viewpoint of the present invention, preferably not less than 2 μm, further preferably not less than 5 μm. If the differences between the widths Wgnd, W of the bases 2a, 3a and the widths Wgup, Wup of the corresponding projection parts 2b, 3b become excessively large, the effect of reducing the electrode loss by the present invention would be reduced. Therefore, from this point of view, the above differences are preferably not more than 30 μm, further preferably not more than 20 μm.

The thickness Tml of the bases 2a, 3a is preferably not more than 15 μm, further preferably not more than 10 μm, from the viewpoint of enhancing the patterning accuracy. Further, from the viewpoint of securing the conductivity, the thickness Tml of the bases 2a, 3a is preferably not less than 1 μm.

The thickness Tmup of the projection parts 2b, 3b is preferably not less than 10 μm, further preferably not less than 15 μm, from the viewpoint of reducing the electrode loss. The upper limit of the thickness Tmup is not particularly limited, which is decided by the velocity matching and characteristic impedance required, and in some cases, it is preferably not more than 100 μm, for example.

The width G1 of the gap where the optical waveguide is disposed is not particularly limited; however it is preferably 5 to 100 μm, further preferably 10 to 20 μm.

The thickness Tsub of the optical waveguide substrate 5 is not particularly limited; however it is preferably not more than 20 μm, further preferably not more than 10 μm, from the viewpoint of velocity matching. Further, from the viewpoint of substrate strength, it is preferably not less than 1 μm.

A preferable manufacturing process of the optical modulator according to the present invention will be described hereinafter.

As shown in FIG. 5(a), a substrate material 11 made of an electro-optical material with a waveguide formed is prepared. As shown in FIG. 5(b), a metal underlying film 12 is formed on a surface 11a of the substrate 11. The type of such a metal underlying film is not particularly limited, but the followings can be exemplified: an Au film, a multilayered film in which the Au film is laminated on a bedding Cr film, and a multilayered film in which the Au film is laminated on a bedding Ti film. The method of forming the films is not particularly limited; however, the spattering method and the evaporation method can be exemplified.

Next, as shown in FIG. 5(c), resists 23 are formed on the metal underlying film 12 by the photolithography method (FIG. 5(c)).

Next, as shown in FIG. 6(a), electrode bases 2a, 3a are formed between the resists 23. The method of forming this base is not limited, but the plating is preferable. Next, by peeling the resists 23, the state of FIG. 6(b) is obtained. Then, as shown in FIG. 6(c), resists 13 are formed on the bases 2a, 3a and the metal underlying film 12. Here, by forming a projection 13a on the bases 2a, 3a, the opening width of the resist 13 is made narrower than that of the resist 23.

Next, projection parts 2b, 3b are formed on the opening of the resist pattern 13 (FIG. 7(a)). The method of forming this part is not limited, but the plating is preferable. Next, the resist pattern 13 is removed and the bases 2a, 3a and the projection parts 2b, 3b are formed, as shown in FIG. 7(b). Then, unnecessary metal underlying film 12 is removed to form the electrodes 2, 3.

The patterning of the resist can be implemented by the general exposure method. A contact aligner can be used in the exposure.

The material of the resist is not particularly limited, and the followings can be exemplified: novolak resin positive resist, backbone cutting (decomposition) positive resist, cyclized polyisoprene azido compound negative resist, phenol resin azido compound negative resist, dissolution restraint electron beam positive resist, and cross-linked electron beam negative resist.

EXAMPLES

Example 1

Figure 5:
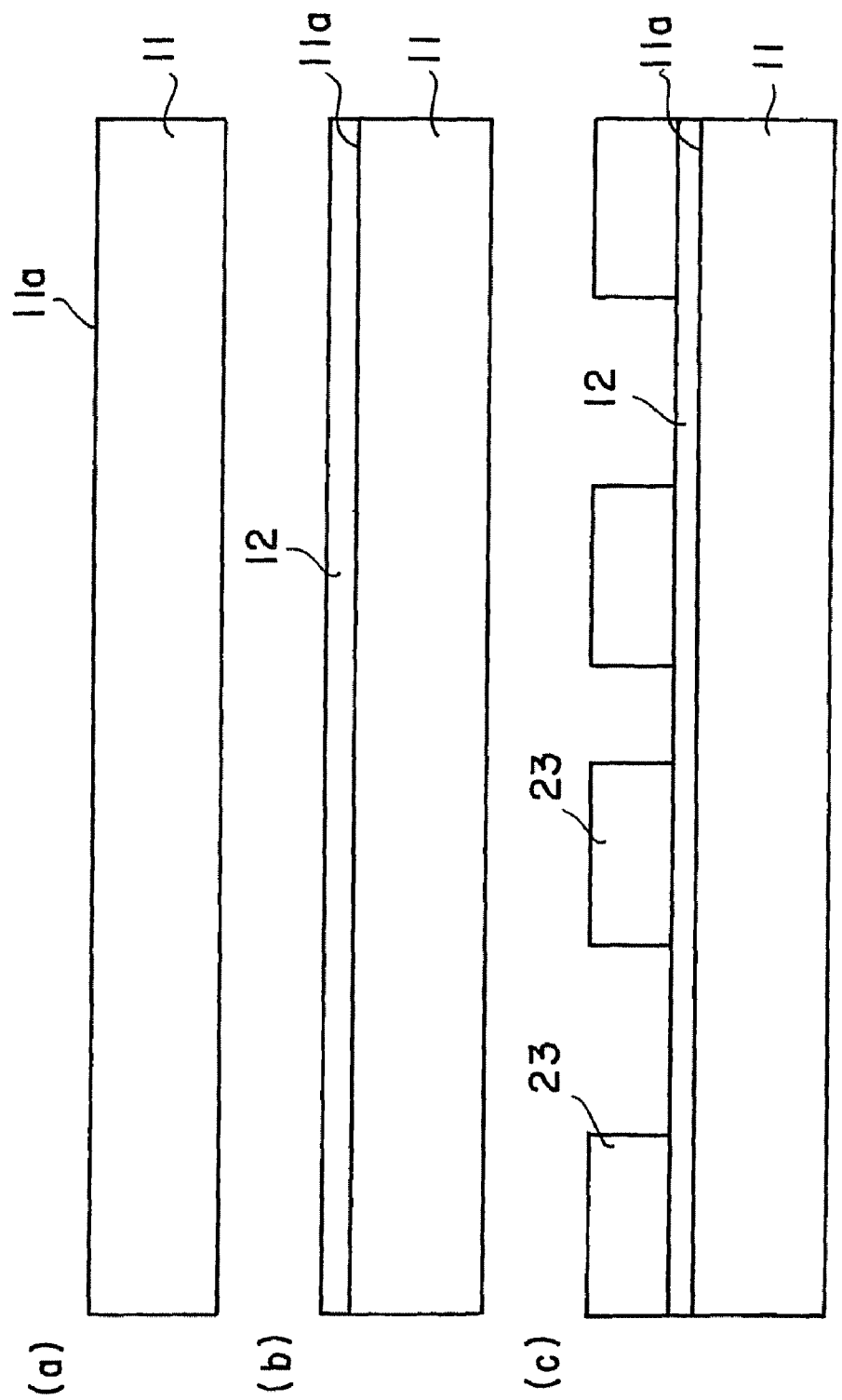
FIG. 5(a) illustrates a substrate material 11.
FIG. 5(b) illustrates the state that a metal underlying film 12 is formed on the substrate material 11.
FIG. 5(c) illustrates the state that resists 23 are formed on the metal underlying film 12.
Figure 6:
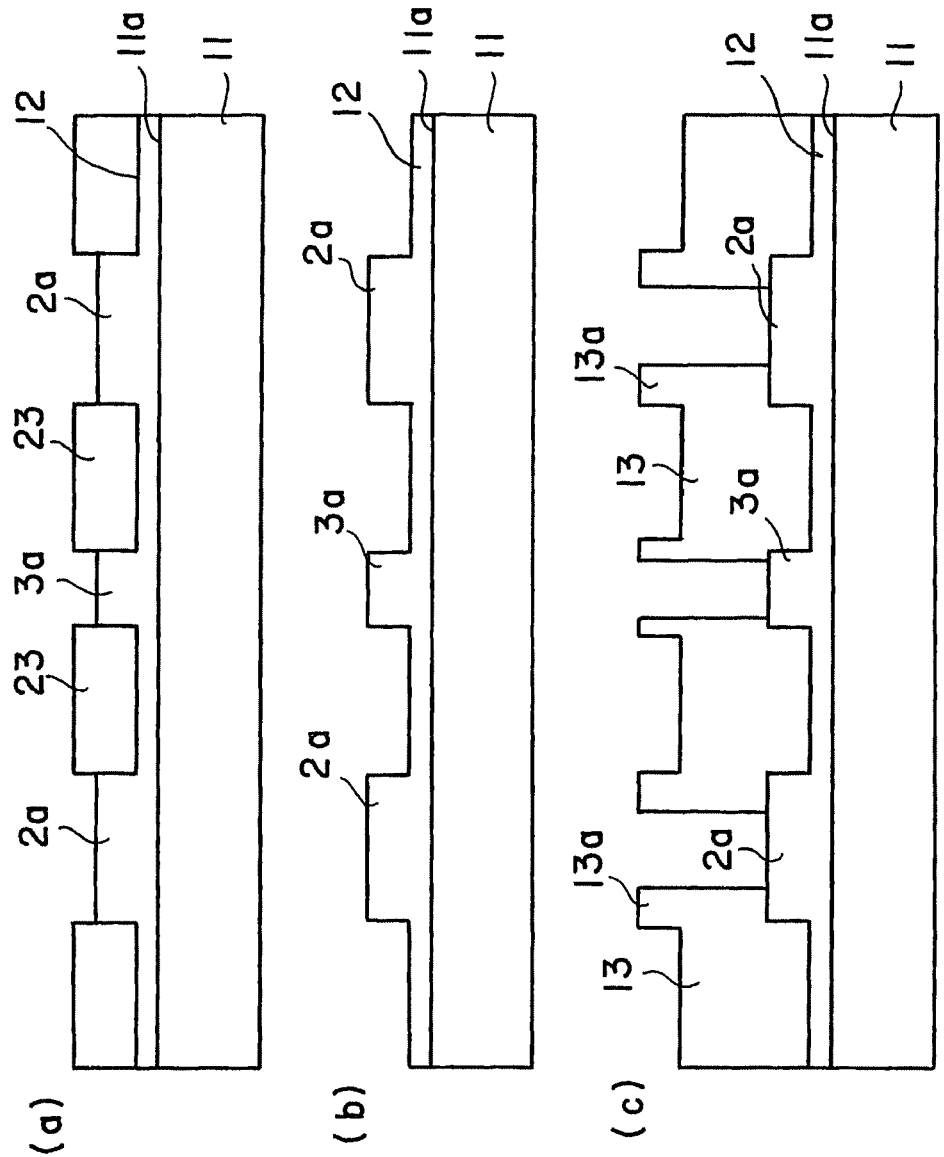
FIG. 6(a) illustrates the state that bases 2a, 3a are formed.
FIG. 6(b) illustrates the state that the resists 23 are removed.
FIG. 6(c) illustrates the state that new resists 13 are formed.
Figure 7:
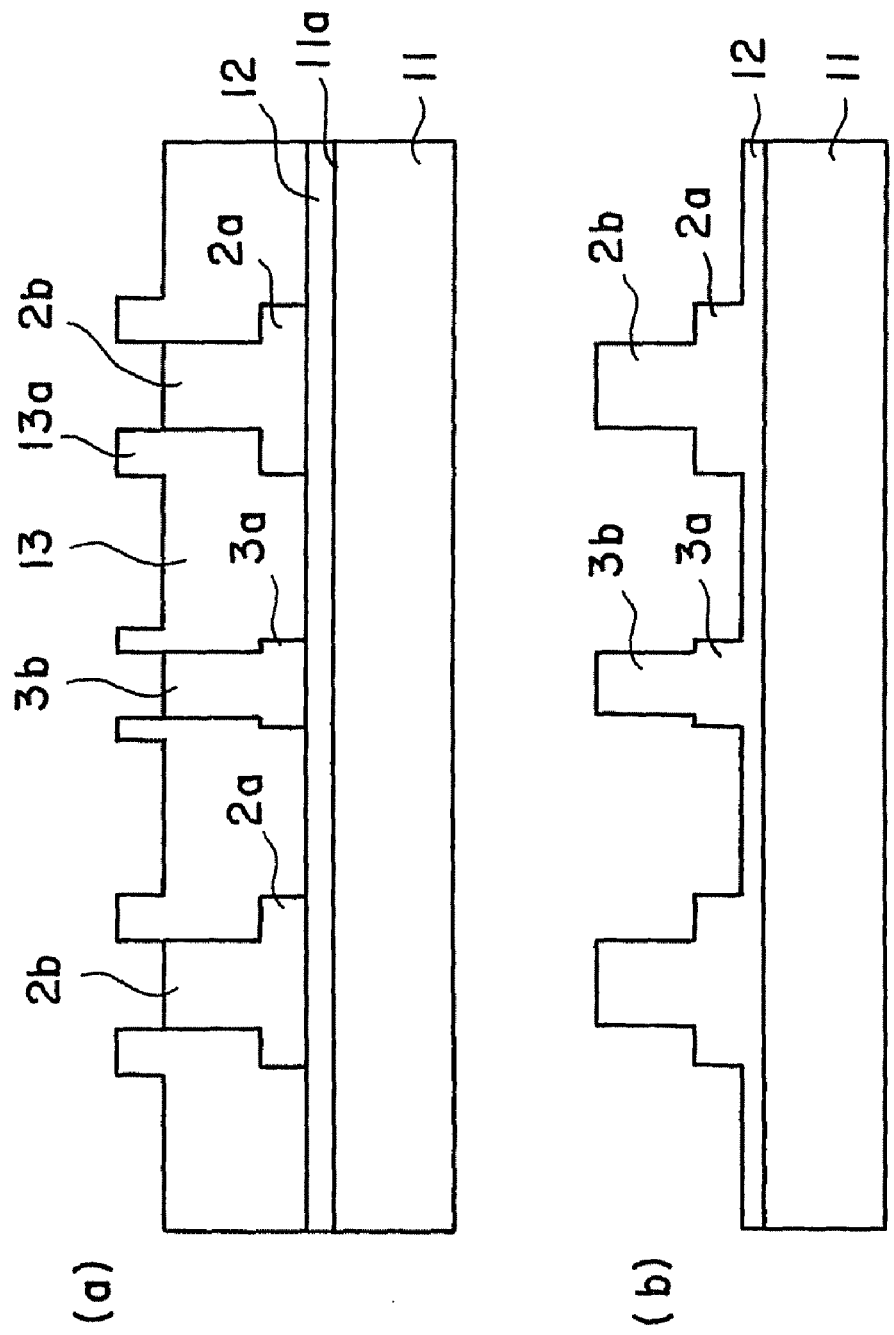
FIG. 7(a) illustrates the state that projection part 2b, 3b are formed inside the resist 13.
FIG. 7(b) illustrates the state that the resists 13 are removed from the state in FIG. 7(a).

According to the manufacturing methods described with reference to FIG. 5 through FIG. 7, the optical modulator 20 illustrated in FIGS. 1, 2, 3 and 4 was manufactured. As the material for the optical waveguide substrate 5 and the supporting substrate 8, lithium niobate (LN) single crystal was used. The electrodes 2, 3 were formed with gold. The adhesive layer 6 being also as the low dielectric constant layer was formed with an organic adhesive.

After the Au film 12 was deposited on the LN wafer 11 in which an optical waveguide was formed by the Ti-diffusion method, the desired resists 23 were formed by the general photolithography method, where the electrode bases 2a, 3a were gold-plated. After peeling the resists 23, the resists were again coated, the second resists 13 for the electrodes were formed by photolithography, and the projection parts 2b, 3b were formed by the gold-plating, followed by removing unnecessary underlying film. The substrate 11 was adhered to the supporting substrate 8 by means of an organic adhesive. This adhered substance was cut out into element forms of desired sizes by a dicing saw, and various element characteristics were measured.

The dimensions of the manufactured optical modulator will be described. The thickness Tsub of the optical waveguide substrate 5 is 7 μm, the gap width G1 is 16.5 μm, the gap width G2 is 90 μm, the ground electrode width Wgnd is 100 μm, and the width W of the base 3a is 60 μm. The thickness Tml of the base 3a was set to 2, 4, 6 and 8 μm, the width Wup of the projection part 3b was varied as shown in FIG. 8, and the thickness Tmup of the projection part 3b is varied as shown in FIG. 8.

Example 2

Figure 8:
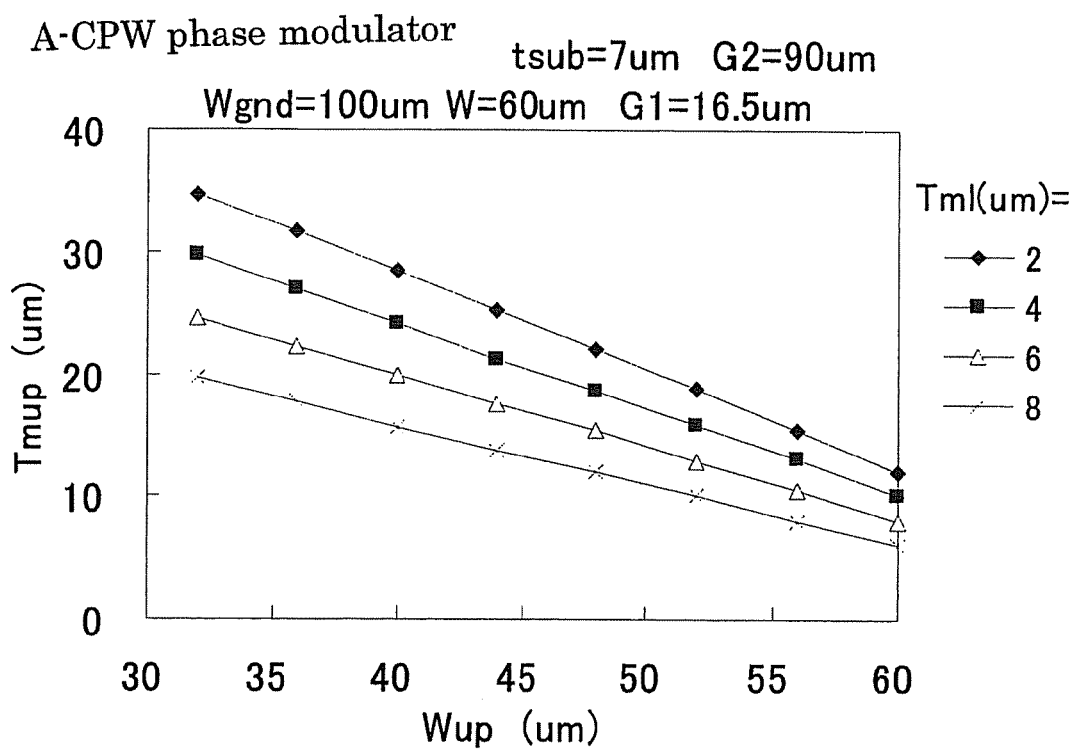
FIG. 8 is a graph illustrating the phase matching condition when Tmup, Tml and Wup are varied.
Figure 9:
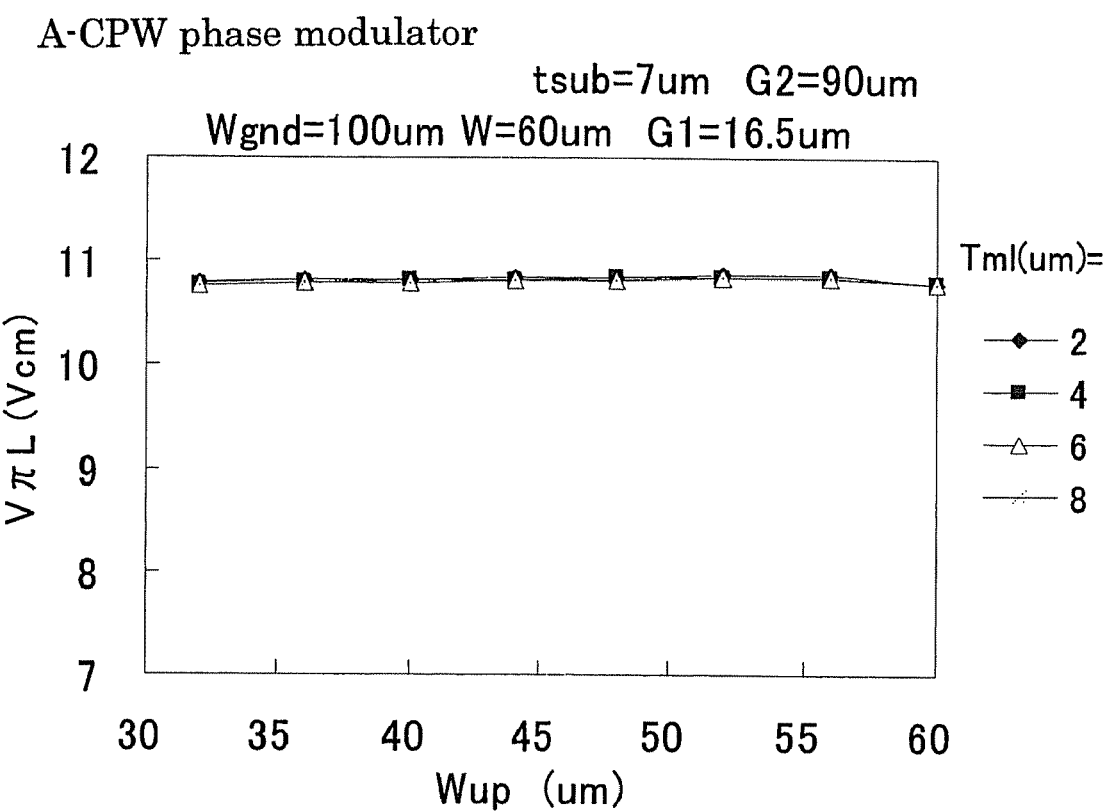
FIG. 9 is a graph illustrating a change of the drive voltage $V\pi L$ when Wup and Tml are varied.

In the same optical modulator as in the example 1, the thickness Tmup of the projection part 3b was set such that the velocity matching condition illustrated in FIG. 8 was satisfied to each Wup. The thickness Tml of the base 3a was set to 2, 4, 6 and 8 μm, and the width Wup of the projection part 3b was varied as shown in FIG. 9. The drive voltage VπL was measured to each modulator. As a result, it was confirmed that varying the width Wup of the projection part hardly exerts an influence on the drive voltage.

Example 3

Figure 10:
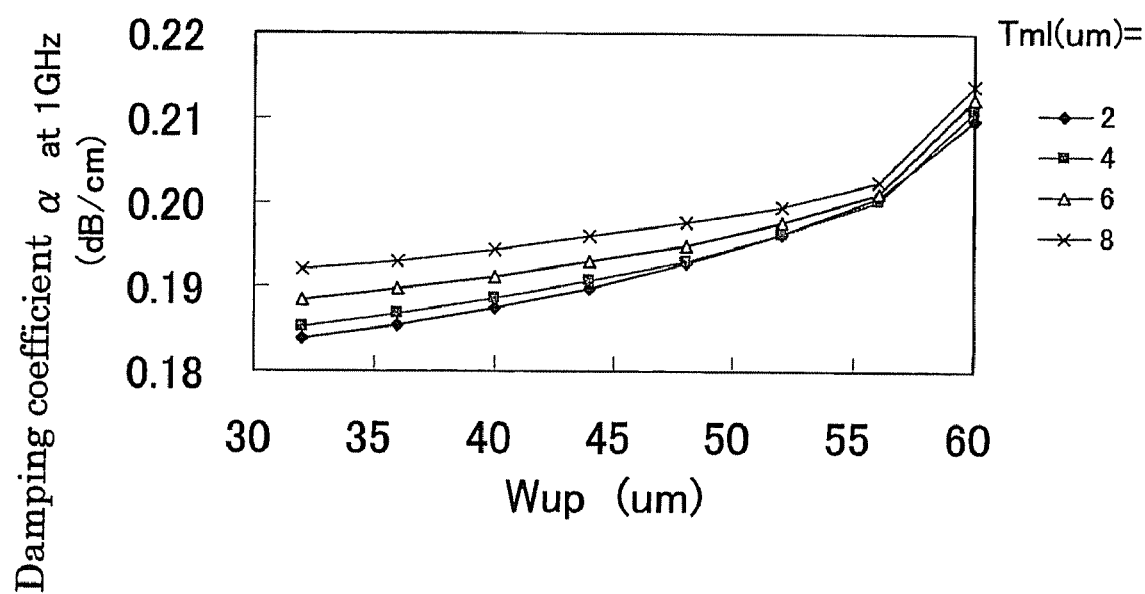
FIG. 10 is a graph illustrating a change of the electrode loss α when Wup and Tml are varied.

In the same optical modulator as in the example 1, the thickness Tmup of the projection part 3b was set such that the velocity matching condition illustrated in FIG. 8 was satisfied to each Wup. The thickness Tml of the base 3a was set to 2, 4, 6 and 8 μm, and the width Wup of the projection part 3b was varied as shown in FIG. 10. The electrode loss (attenuation constant) α at 1 GHz was measured to each modulator. As a result, it was confirmed that while the electrode loss α becomes relatively large at the width Wup 60 μm of the projection part (comparative example), the electrode loss is lowered as the width Wup of the projection part is decreased.

Example 4

Figure 11:
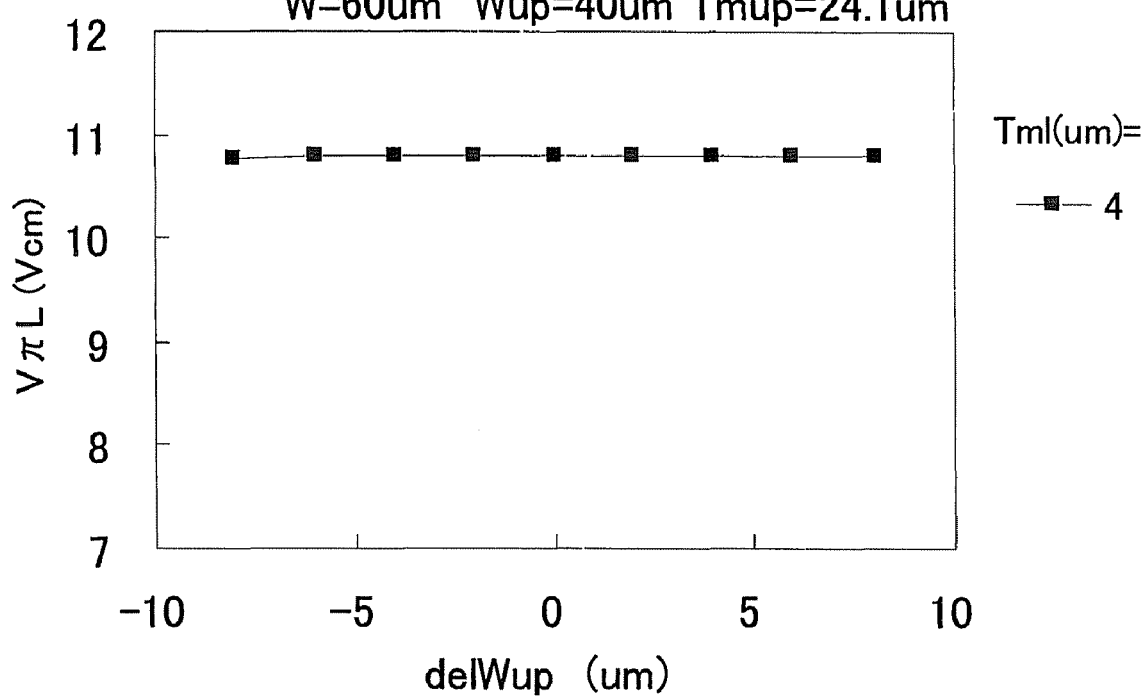
FIG. 11 is a graph illustrating a change of the drive voltage $V\pi L$ when a deviation delWup of the position of the projection part is varied.

In the example 1, G2 was set to 90 μm, the thickness Tmup of the projection part 3b was set to 24 μm, the thickness Tml of the base 3a was set to 4 μm, and the width Wup of the projection part 3b was set to 40 μm. In patterning the projection part, the center position thereof was intentionally deviated within ±10 μm from the center position of the base. The drive voltage VπL was measured against this deviation referred to as delWup (refer to FIG. 4), and the measurement result is shown in FIG. 11.

As a result, it was confirmed that if the center position of the projection part is deviated within ±10 μm from the center position of the base, the drive voltage VπL is hardly changed. This means that if the patterning position is deviated in patterning a thick projection part, there is an extremely small influence on the drive voltage VπL.

Example 5

Figure 12:
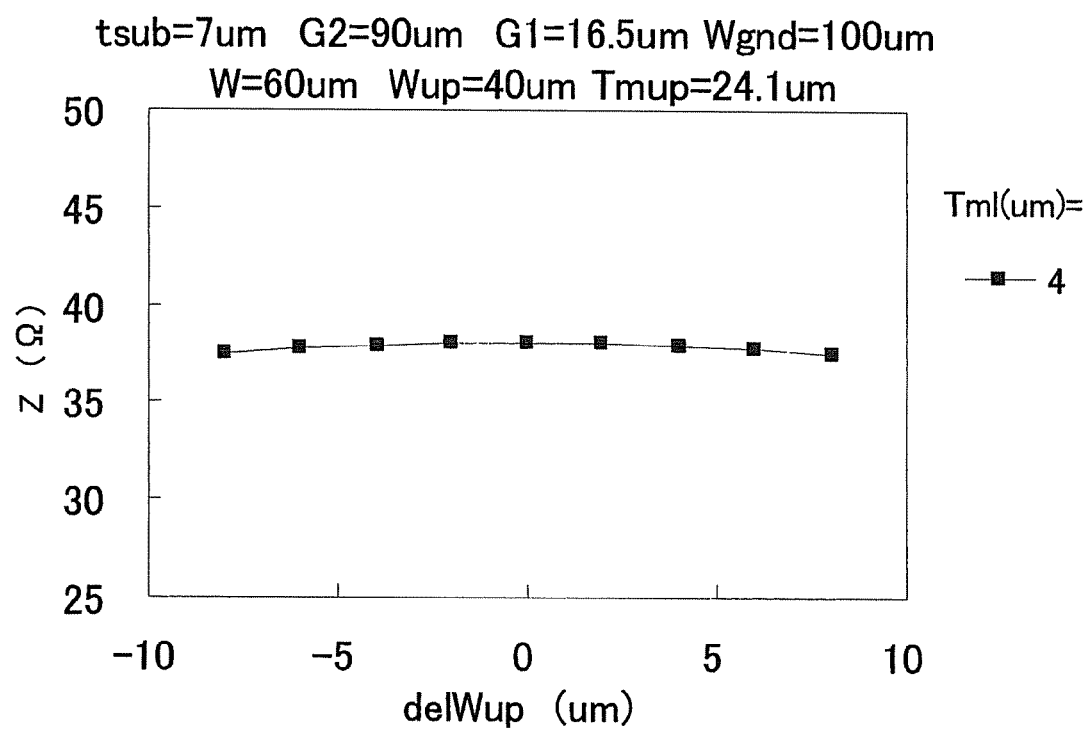
FIG. 12 is a graph illustrating a change of the characteristic impedance Z when the deviation delWup of the position of the projection part is varied.

In the example 1, G2 was set to 90 μm, the thickness Tmup of the projection part 3b was set to 24 μm, the thickness Tml of the base 3a was set to 4 μm, and the width Wup of the projection part 3b was set to 40 μm. In patterning the projection part, the center position thereof was intentionally deviated within ±10 μm from the center position of the base. The characteristic impedance Z was measured against this deviation referred to as delWup (refer to FIG. 4), and the measurement result is shown in FIG. 12.

As a result, it was confirmed that if the center position of the projection part is deviated within ±10 μm from the center position of the base, the characteristic impedance Z is hardly changed. This means that if the patterning position is deviated in patterning a thick projection part, there is an extremely small influence on the characteristic impedance Z.

Example 6

Figure 13:
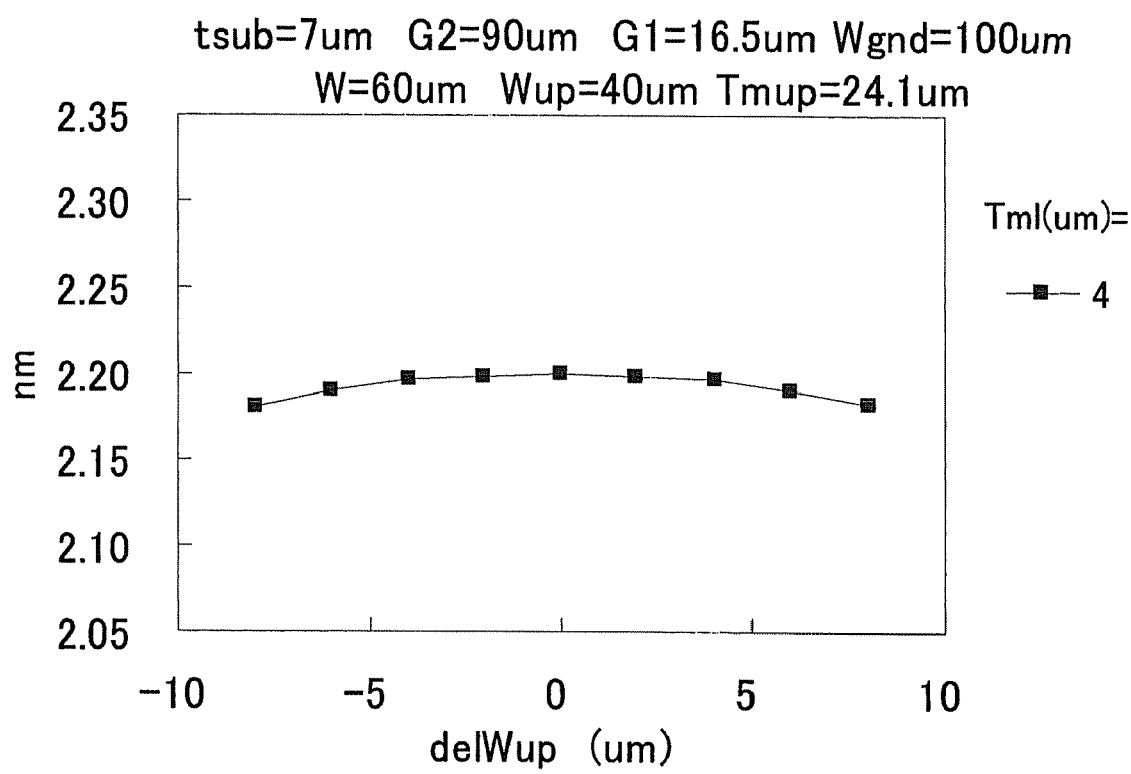
FIG. 13 is a graph illustrating a change of the microwave refractive index nm when the deviation delWup of the position of the projection part is varied.

In the example 1, G2 was set to 90 μm, the thickness Tmup of the projection part 3b was set to 24 μm, the thickness Tml of the base 3a was set to 4 μm, and the width Wup of the projection part 3b was set to 40 μm. In patterning the projection part, the center position thereof was intentionally deviated within ±10 μm from the center position of the base. The microwave refractive index nm was measured against this deviation referred to as delWup (refer to FIG. 4), and the measurement result is shown in FIG. 13.

As a result, it was confirmed that if the center position of the projection part is deviated within ±10 μm from the center position of the base, the microwave refractive index nm is hardly changed. This means that if the patterning position is deviated in patterning a thick projection part, there is an extremely small influence on the microwave refractive index nm.

Example 7

Figure 14:
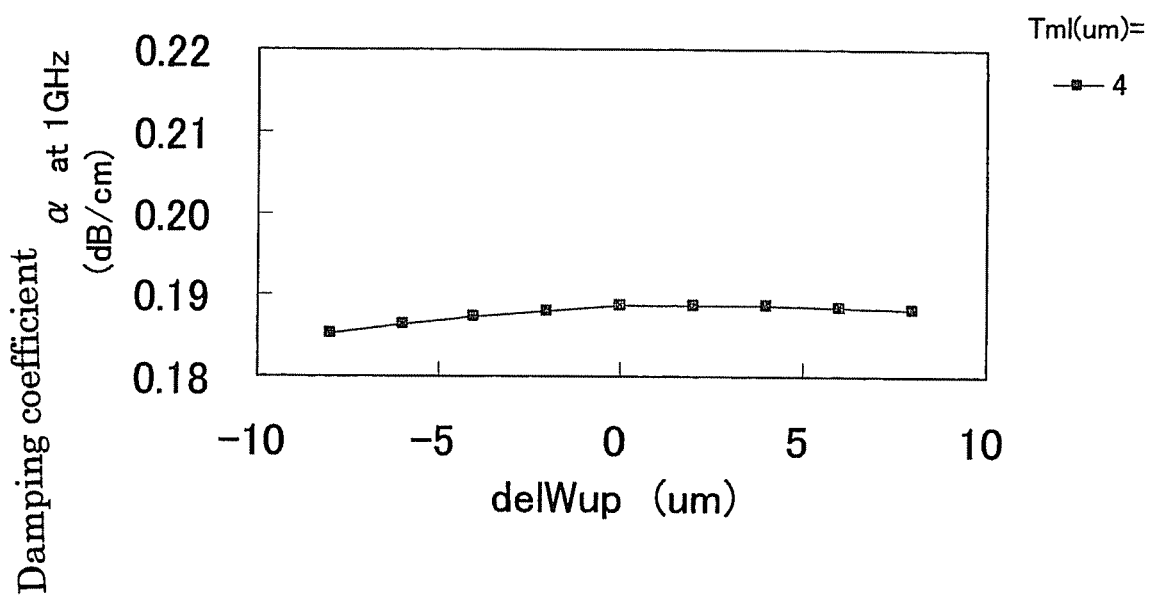
FIG. 14 is a graph illustrating a change of the electrode loss α when the deviation delWup of the position of the projection part is varied.

In the example 1, G2 was set to 90 μm, the thickness Tmup of the projection part 3b was set to 24 μm, the thickness Tml of the base 3a was set to 4 μm, and the width Wup of the projection part 3b was set to 40 μm. In patterning the projection part, the center position thereof was intentionally deviated within ±10 μm from the center position of the base. The electrode loss (attenuation constant) a was measured against this deviation referred to as delWup (refer to FIG. 4), and the measurement result is shown in FIG. 14. As a result, it was confirmed that if the center position of the projection part is deviated within ±10 μm from the center position of the base, the electrode loss is hardly changed. This means that if the patterning position is deviated in patterning a thick projection part, there is an extremely small influence on the electrode loss α.

In the description of the above example, the asymmetric coplanar strip line (A-CPS: Asymmetric Coplanar Strip or A-CPW: Asymmetric Coplanar Waveguide) was used as the electrode. In the same manner, it is possible to achieve the similar effect to the present invention also for a modulation electrode using, for example, a coplanar strip line CPW (Coplanar Waveguide), when the characteristic impedance is designed so as to take an appropriate value, and such a substrate thickness and an electrode dimension that satisfy the velocity matching condition are adopted.

In the above example, an X-cut lithium niobate was used to the optical waveguide substrate 5. When a Z-cut lithium niobate is used to the optical waveguide substrate 5, for example, the following dimensions are generally adopted: the substrate thickness Tsub is 0.1 to 1 mm, the width W of the signal electrode is about 5 to 20 μm, and the gap width G between the signal electrode and the ground conductor is about 10 to 100 μm. By setting the electrode thickness Tml of the base to about 1 to 15 μm, setting the differences between the widths Wgnd, W of the base and the widths Wgup, Wup of the corresponding projection parts to about 2 to 30 μm, and setting the electrode thickness Tmup of the projection part so as to satisfy the velocity matching condition, the electrode losses can be reduced. In the case where the gap width G is large, the thickness Tmup of the projection part may be preferably about 100 μm. It is obvious that the present invention can also be applied to an optical modulator using traveling-wave electrodes or lumped electrodes.

The invention claimed is:

1. An optical modulator comprising:
    a substrate comprising an electro-optical material;
    a plurality of modulation electrodes on the substrate; and
    a plurality of optical waveguides on or in the substrate, wherein:
        light propagating through the plurality of optical waveguides is modulated when applying a modulation voltage on the plurality of modulation electrodes;
        at least a part of each of the plurality of modulation electrodes comprises a base formed on the substrate and a projection part having a width narrower than that of the base;
    each of the plurality of modulation electrodes comprises a pair of a signal electrode and a ground electrode;
    a first gap is formed between the projection part of a first signal electrode and the projection part of a first ground electrode of a first modulation electrode;
    a second gap is formed between the projection part of a second signal electrode and the projection part of a second ground electrode of a second modulation electrode;
    a third gap is formed between the first modulation electrode and the second modulation electrode; and
    first and second of the plurality of optical waveguides are disposed in the first gap and in the second gap, respectively,
    wherein the second gap is wider than the first gap.

2. The optical modulator of claim 1, wherein the projection part is thicker than the base.

3. The optical modulator of claim 1, wherein the third gap is free of any optical waveguide.

4. The optical modulator of claim 1, wherein the difference between the widths of the plurality of the bases and the width of the plurality of corresponding projection parts is less than 30 μm.

5. The optical modulator claim 1, wherein the electro-optical material of the substrate is in direct contact with the base.

* * * * *